(12) United States Patent
Urmanov et al.

(10) Patent No.: US 8,868,473 B2
(45) Date of Patent: Oct. 21, 2014

(54) DECISION MAKING WITH ANALYTICALLY COMBINED SPLIT CONDITIONS

(75) Inventors: Aleksey Urmanov, San Diego, CA (US); Anton Bougaev, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 255 days.

(21) Appl. No.: 13/279,447

(22) Filed: Oct. 24, 2011

(65) Prior Publication Data

US 2013/0103618 A1   Apr. 25, 2013

(51) Int. Cl.
*G06K 9/62* (2006.01)
*G06N 99/00* (2010.01)

(52) U.S. Cl.
CPC ............ *G06N 99/005* (2013.01); *G06K 9/6282* (2013.01)
USPC .......................................................... 706/12

(58) Field of Classification Search
CPC .............................. G06F 15/18; G06N 99/005
USPC ................................................ 706/12, 14, 20
See application file for complete search history.

(56) References Cited

U.S. PATENT DOCUMENTS

| | | | |
|---|---|---|---|
| 7,007,123 B2 * | 2/2006 | Golla et al. | 710/243 |
| 7,478,075 B2 | 1/2009 | Urmanov et al. | |
| 7,660,775 B2 | 2/2010 | Bougaev et al. | |
| 7,933,850 B1 | 4/2011 | Urmanov et al. | |
| 2010/0235527 A1 * | 9/2010 | Pelton et al. | 709/230 |
| 2010/0281009 A1 * | 11/2010 | Wen et al. | 707/705 |
| 2010/0332189 A1 | 12/2010 | Urmanov et al. | |

OTHER PUBLICATIONS

Brodley, Carla E.; Multivariate Decision Trees; Machine Learning; vol. 19, (1995) pp. 45-77.*
Bougaev, Anton; Pattern Recognition Method Based on Rvachev Functions with Engineering Applications; Purdue University Dec. 2006.*
Murthy, et al., "A system for Induction of Oblique Decision Trees", Journal of Artificial Intelligence Research 2, 1-33, 1994.
Sunil Vadera, "Inducing safer oblique trees without costs", Expert Systems, Sep. 2005, pp. 206-221, vol. 22, No. 4.
Heath, et al., "Induction of Oblique Decision Trees", in Proc. of the 13th Joint Conf. on Artificial Intelligence, pp. 1002-1007, Chambery, France, Morgan Kaufmann, 1993.

* cited by examiner

*Primary Examiner* — Kakali Chaki
*Assistant Examiner* — Kevin W Figueroa
(74) *Attorney, Agent, or Firm* — Kraguljac Law Group, LLC

(57) ABSTRACT

Systems, methods, and other embodiments associated with decision making with analytically combined split conditions are provided. In one embodiment, a method for classifying data is provided. An input data sample is received for classification as belonging to one of two possible classes. The input data sample includes a set of attribute values. The method includes evaluating the set of attribute values with a tree function that defines a decision boundary of a classification tree. The tree function classifies an input data sample as belonging to one of the two possible classes based, at least in part, on the attribute values of the input data sample. In another embodiment parameters of the tree function are derived by applying a gradient descent parameter update rule to the training data samples.

10 Claims, 5 Drawing Sheets

DECISION MAKING WITH ANALYTICALLY COMBINED SPLIT CONDITIONS

BACKGROUND

Data mining and decision support technologies use machine learning to support data classification and to implement decision trees. Technology areas that utilize machine learning include merchandise mark-down services in retail applications, clinician diagnosis and treatment plan assistance based on similar patients' characteristics and general purpose data mining. Decision or classification trees have become one of the most popular data analysis and decision making support tools in recent years due to the ease of understanding of their operation. Numerous algorithms and software packages are available to construct and visualize decision trees.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

A traditional classification tree can be described as a set of tests on data attributes organized in a tree-like structure. At each tree node a test is performed that compares one of the attributes of an input data sample against a constant and then the tree splits into two or more sub-trees depending on the test outcome. The process continues on other attributes including the ones already tested. Eventually at a leaf node a classification of the input data sample is made.

Figure 1:
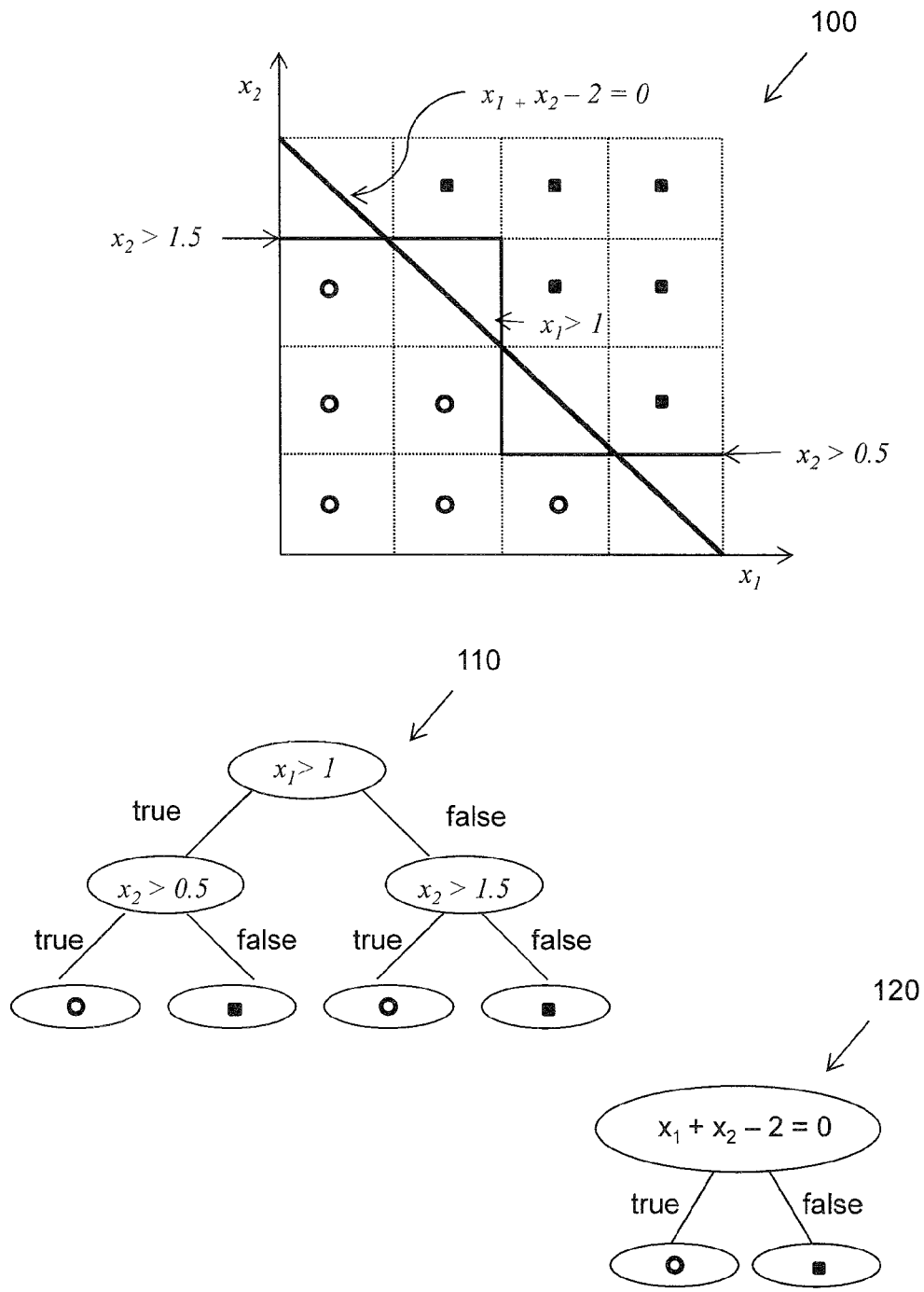
FIG. 1 illustrates one example of a classification tree with multiple single attribute split condition nodes as compared to a classification tree having a single decision boundary split condition node.

FIG. 1 illustrates a simple example of a set of training data plotted at 100 and a traditional classification tree 110 that can be used to classify future input data samples. Each data sample is a vector having two attributes $x_1$ and $x_2$. Each data sample belongs to one of the two classes "circle" and "square." The goal is to build a classification tree that, given the attribute values of a data sample, assigns this data sample to either class. In FIG. 1, the set of input data samples 100 includes six data samples belonging to the circle class and six data samples belonging to the square class.

A classification tree that tests only one attribute (either $x_1$ or $x_2$) in each node would have at least three nodes like the classification tree 110. Each node includes a split condition that tests a single attribute of an input data sample at a time. A classification of the data sample as either circle or square is provided at the leaf nodes of the tree. The decision boundary of the tree is represented by the set of solid lines parallel to either axis in FIG. 1. Each node in the classification tree 110 corresponds to a section of the decision boundary that deals with a single attribute. It is easy to see from FIG. 1 how quickly the size and complexity of a classification tree with single attribute split condition nodes will increase as data samples include more attributes.

A successful implementation of a classification tree like the classification tree 110 requires a significant effort and expertise to work around limitations that affect the predictive power of classification tree-based systems. Often the classification tree becomes over-complicated to the point that it loses interpretability and may overfit the data, resulting in poor generalization. In part, this originates from the use of heuristics in classification tree learning algorithms in practical applications.

An example classification tree 120 with single node having a multi-attribute split condition is shown in FIG. 1. The split condition, $x_1+x_2-2=0$, is sufficient to correctly separate all of the data samples into the two classes. The split condition defines, in a single node, the decision boundary (diagonal line in the plot of data samples 100) of the overall classification tree. The classification tree 120 is smaller, with only three nodes as opposed to seven nodes for the classification tree 110. This difference in tree sizes is especially pronounced for high dimensional data sets with complex boundaries separating the data samples belonging to different classes.

The methods and systems described herein generate, and process data with, classification trees that include nodes with analytically combined split conditions representing the decision boundary of the overall classification tree. The analytically combined split conditions deal with multiple attributes to define the decision boundary in a single node. Classification trees with multi-attribute linear and non-linear split conditions are compact and provide improved predictive power. A gradient descent type learning algorithm may be used to incrementally derive the decision boundary split condition for a classification tree.

Figure 2:
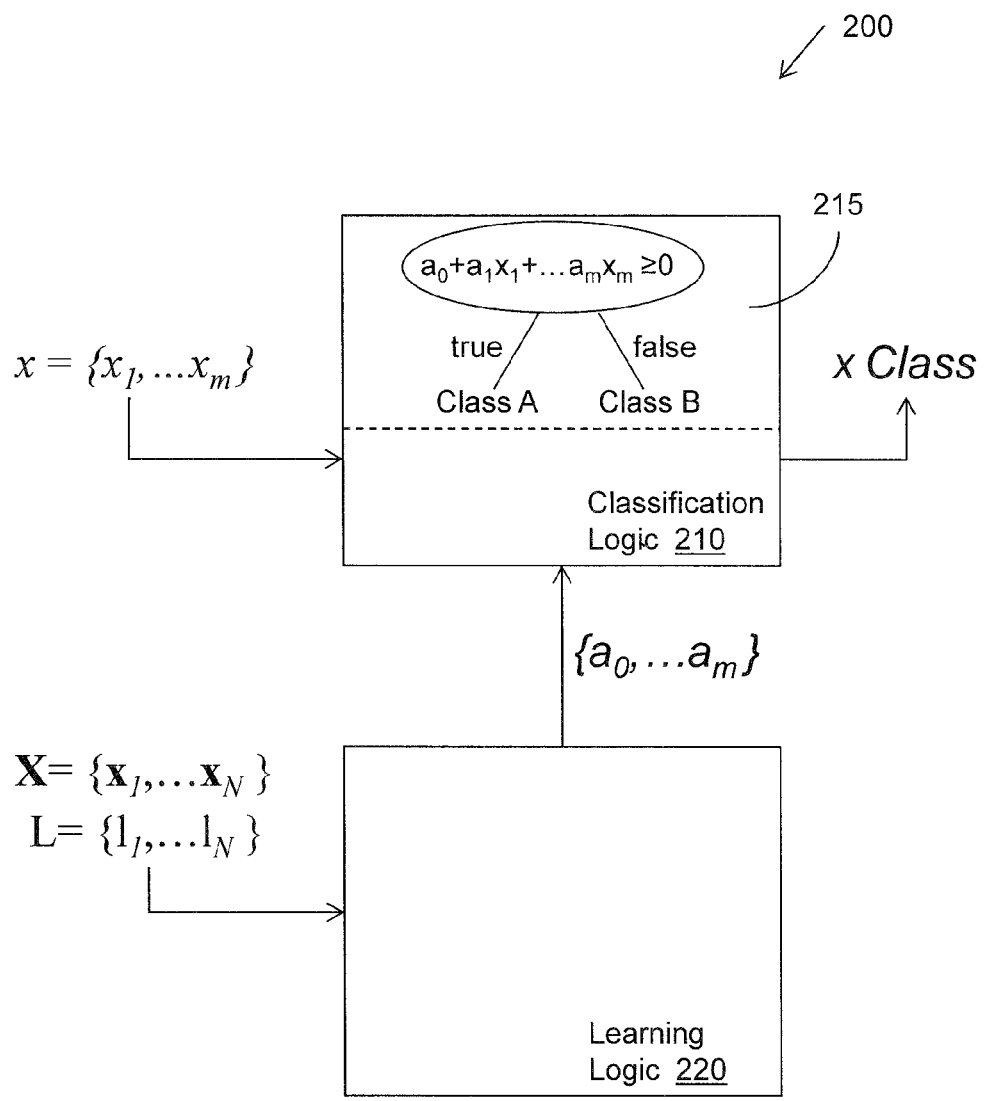
FIG. 2 illustrates one example embodiment of a system associated with classification trees with decision boundary split conditions.

FIG. 2 illustrates one example embodiment of system 200 that classifies input data samples using a classification tree with a decision boundary split condition. The system 200 includes a classification logic 210 that has access to a stored classification tree 215. The classification tree 215 includes a tree function (e.g., the split condition $a_0+a_1x_1+\ldots a_mx_m \geq 0$ in the single node) that defines a decision boundary of the classification tree. Thus, the tree function classifies an input data sample as belonging to one of two possible classes based, at least in part, on attribute values of the input data sample. The classification logic 210 is configured to receive an input data sample x (a vector having m attributes) for classification and to evaluate attribute values of the input data sample with the tree function to determine a classification of the input data sample.

The tree function is determined by a learning logic 220 operating on training data X and L. X is a set of N vectors having m attributes and L is a set of corresponding classifications (e.g., "A" or "B") for each data sample in X. The learning logic 220 derives split parameters $\{a_0, \ldots, a_m\}$ that are used as weights for the data sample attributes in the tree function accessed by the classification logic. The learning logic 220 applies a gradient descent parameter update rule to the training data to derive the split parameter values from the training data samples, as will be describe now in detail.

A logical statement describing the classification produced by a binary classification tree with root node n for an unknown vector of attributes x can be expressed as $(T_1(n,x) \geq 0)$. One way to define such a predicate is by realizing that a binary classification tree is a disjunction of conjunctions of split conditions. Thus it can be written as a Boolean function (using recursive definition):

$$(T_1(n,x) \geq 0) = (n.c(x) \geq 0) \wedge (T_1(n.l,x) \geq 0) \vee (n.c(x) < 0)$$
$$\wedge (T_1(n.r,x) \geq 0) \quad (1)$$

Where c(x) is the split condition at the node n, for example $x_1 > 1$ or $x_1 + 2x_2 < 0$ and where n.l and n.r are immediate left and right child nodes of node n. The symbol $\wedge$ denotes logical AND, and $\vee$ denotes logical OR. Generalization to multi-way trees is straightforward.

The split condition c(x) or the test at a node can be any of the following: a single attribute test, e.g. $x_i > v_i$, multi-attribute test (linear combination), multi-attribute test (nonlinear combination) and logical combination of attributes, logical combination of linear and nonlinear combinations of attributes. In order to derive the split condition or decision boundary of the overall classification tree applying a gradient descent method, it is necessary to differentiate the tree function (1) which is a logical function, not capable of differentiation.

To overcome this mathematical obstacle, the tree function is established using the apparatus of Rvachev functions (hereinafter R-functions). An R-function is a real-valued function whose sign changes only if sign of one of the argument changes. This property allows representation of Boolean operations such as logical OR, logical AND, and other operations by means of analytical functions that can be differentiable a desired number of times. Using R-functions to represent logical operators, the separating boundary associated with the tree can be presented as an analytical function. Namely, $$T_1(n,x) = f_\vee ( f_\wedge(n.c(x), T_1(n.l,x)), f_\wedge(-n.c(x), T_1(n.r, x))) \quad (2)$$

where R-disjunction, denoted $f_\vee$, and R-conjunction functions, denoted $f_\wedge$, are intuitively similar to logical OR and AND functions but given analytically by the following equations:

$$f_\vee(s_1, s_2) = \frac{1}{1+\alpha}\left(s_1 + s_2 + \sqrt{s_1^2 + s_2^2 - 2\alpha s_1 s_2}\right) \quad (3)$$

$$f_\wedge(s_1, s_2) = \frac{1}{1+\alpha}\left(s_1 + s_2 - \sqrt{s_1^2 + s_2^2 - 2\alpha s_1 s_2}\right) \quad (4)$$

As an example, when either of the two real-valued variables $s_1 > 0$ or $s_2 > 0$, $f_\vee(s_1, s_2) > 0$. And only when both $s_1 < 0$ and $s_2 < 0$, the value of $f_\vee$ is negative. Therefore, if we associate the plus sign with TRUTH and the minus sign with FALSE, the $f_\vee$ function implements logical OR operation. Similarly the $f_\wedge$ function implements logical AND operation. An R-function is a real-valued function whose sign is fully determined by the signs of its arguments. R-functions can be constructed to be a desired number of times differentiable.

Once the tree is built, given a new previously unseen data sample, the classification of the new data sample is performed by the tree according to the following rules:

$T_1(n,x) \geq 0$ for x from class A.

$T_1(n,x) < 0$ for x not belonging to class A.

$T_1(n,x) = 0$ implicitly defines the decision boundary and $n.c(x) = n.a_0 + n.a_1 x_1 + \ldots + n.a_m x_m$ is split condition function in the node.

To be able to learn a decision tree represented by means of R-function from a training data set of labeled samples, it is required to be able to find partial derivatives of the R-functions representing logical operations with respect to its arguments and parameters. The derivatives of the R-disjunction and R-conjunction with respect to the first and to the second argument are denoted as $f_\vee^{(s_1)}$, $f_\wedge^{(s_1)}$ and $f_\vee^{(s_2)}$, $f_\wedge^{(s_2)}$ respectively and given by:

$$f_\vee^{(s_1)}(s_1, s_2) = \frac{\partial f_\vee(s_1, s_2)}{\partial s_1} = \frac{1}{1+\alpha}\left(1 + \frac{s_1 - \alpha s_2}{\sqrt{s_1^2 + s_2^2 - 2\alpha s_1 s_2}}\right) \quad (5)$$

$$f_\wedge^{(s_1)}(s_1, s_2) = \frac{\partial f_\wedge(s_1, s_2)}{\partial s_1} = \frac{1}{1+\alpha}\left(1 - \frac{s_1 - \alpha s_2}{\sqrt{s_1^2 + s_2^2 - 2\alpha s_1 s_2}}\right) \quad (6)$$

$$f_\vee^{(s_2)}(s_1, s_2) = \frac{\partial f_\vee(s_1, s_2)}{\partial s_2} = \frac{1}{1+\alpha}\left(1 + \frac{s_2 - \alpha s_1}{\sqrt{s_1^2 + s_2^2 - 2\alpha s_1 s_2}}\right) \quad (7)$$

$$f_\wedge^{(s_2)}(s_1, s_2) = \frac{\partial f_\wedge(s_1, s_2)}{\partial s_2} = \frac{1}{1+\alpha}\left(1 - \frac{s_2 - \alpha s_1}{\sqrt{s_1^2 + s_2^2 - 2\alpha s_1 s_2}}\right) \quad (8)$$

The derivative of $f_\vee(s_1(a), s_2(a))$ and $f_\wedge(s_1(a), s_2(a))$ with respect to a parameter a is given by:

$$\frac{d f_\vee(s_1(a), s_2(a))}{da} = \quad (9)$$
$$f_\vee^{(s_1)}(s_1(a), s_2(a))\frac{ds_1(a)}{da} + f_\vee^{(s_2)}(s_1(a), s_2(a))\frac{ds_2(a)}{da}$$

$$\frac{d f_\wedge(s_1(a), s_2(a))}{da} = \quad (10)$$
$$f_\wedge^{(s_1)}(s_1(a), s_2(a))\frac{ds_1(a)}{da} + f_\wedge^{(s_2)}(s_1(a), s_2(a))\frac{ds_2(a)}{da}$$

Knowing the partial derivatives, the next step is to be able to find partial derivatives of the entire tree with respect to parameters in the split conditions in each node. This is possible because the logical tree function has been replaced with a differentiable analytical expression based on R-functions.

The derivative of the tree function $T_1(n,x)$ with respect to parameter a can be computed in terms of the derivatives of sub-trees $T_1(n.l,x)$ and $T_1(n.r,x)$ as follows (x is omitted for brevity):

$$\frac{dT_1(n)}{da} = \quad (11)$$
$$f_\vee^{(s_1)}(f_\wedge(n.c, T_1(n.l)), f_\wedge(-n.c, T_1(n.r)))\frac{df_\wedge(n.c, T_1(n.l))}{da} +$$
$$f_\vee^{(s_2)}(f_\wedge(n.c, T_1(n.l)), f_\wedge(-n.c, T_1(n.r)))\frac{df_\wedge(-n.c, T_1(n.r))}{da} =$$

-continued $$f_\vee^{(s_1)'}(f_\wedge(n.c, T_1(n.1)), f_\wedge(-n.c, T_1(n.r)))f_\wedge^{(s_1)}(n.c, T_1(n.1))\frac{dn.c}{da} +$$

$$f_\vee^{(s_1)'}(f_\wedge(n.c, T_1(n.1)), f_\wedge(-n.c, T_1(n.r)))$$

$$f_\wedge^{(s_2)}(n.c, T_1(n.1))\frac{dT_1(n.1)}{da} -$$

$$f_\vee^{(s_2)'}(f_\wedge(n.c, T_1(n.1)), f_\wedge(-n.c, T_1(n.r)))f_\wedge^{(s_1)}(-n.c, T_1(n.r))$$

$$\frac{dn.c}{da} + f_\vee^{(s_2)'}(f_\wedge(n.c, T_1(n.1)), f_\wedge(-n.c, T_1(n.r)))$$

$$f_\wedge^{(s_2)}(-n.c, T_1(n.r))\frac{dT_1(n.r)}{da}$$

Same in a more compact form $$\frac{dT_1(n, x)}{da} = \tag{12}$$

$$A(n, x)\frac{dT_1(n.1, x)}{da} + B(n, x)\frac{dn.c(x)}{da} + C(n, x)\frac{dT_1(n.r, x)}{da}$$

where coefficients A, B, and C are defined as:

$$A(n,x) \equiv f_\vee^{(s_1)}(f_\wedge(n.c,T_1(n.l)), f_\wedge(-n.c,T_1(n.r)))$$
$$f_\wedge^{(s_1)}(n.c,T_1(n.l)) \tag{13}$$

$$B(n,x) \equiv f_\vee^{(s_1)}(f_\wedge(n.c,T_1(n.l)), f_\wedge(-n.c,T_1(n.r)))$$
$$f_\wedge^{(s_1)}(n.c,T_1(n.l)) f_\vee^{(s_2)}(f_\wedge(n.c,T_1(n.l)),$$
$$f_\wedge(-n.c,T_1(n.r))) f_\wedge^{(s_1)}(-n.c,T_1(n.r)) \tag{14}$$

$$C(n,x) \equiv f_\vee^{(s_2)}(f_\wedge(n.c,T_1(n.l)), f_\wedge(-n.c,T_1(n.r)))$$
$$f_\wedge^{(s_2)}(-n.c,T_1(n.r)) \tag{15}$$

The derivative of the tree function expressed as derivatives of sub-trees $T_1(n.l,x)$ and $T_1(n.r,x)$ can be used to learn the overall tree function. Let $X=\{x_1, \ldots, x_N\}, x_i \in R^m$ be a data set and $L=\{l_1, \ldots, l_N\}, l_i \in \{-1, +1\}$ are corresponding class labels. An error can defined as follows:

$$e_i = \tan h(T_1(n,x_i)) - l_i \tag{16}$$

where the hyperbolic tangent function and its derivative are given by:

$$\tanh(x) = \frac{e^{2x}-1}{e^{2x}+1} \tag{17}$$

$$\frac{d\tanh(x)}{dx} = 1 - \tanh^2(x) \tag{18}$$

Then the mean square error of classification of the data set X by the tree $T_1(n,x)$ is:

$$MSE = \frac{1}{N}\sum e_i^2 = \frac{1}{N}\sum(\tanh(T_1(n, x_i)) - l_i)^2 \tag{19}$$

The gradient descent learning rule that minimizes the mean square error is:

$$\Delta a = -\mu\frac{\partial MSE(a)}{\partial a} \tag{20}$$

where $\mu > 0$ is the learning rate and $$\frac{\partial MSE(a)}{\partial a} = \tag{21}$$

$$\frac{1}{N}\sum(\tanh(T_1(n, x_i)) - l_i)(1 - \tanh^2(T_1(n, x_i)))\frac{dT_1(n, x_i)}{da}$$

The learning rate $\mu$ specifies the speed of learning and should be selected properly. If the learning rate is too large, the values of split condition parameters will oscillate and will not converge. With a too small learning rate, the convergence can be slow. Optimal values of the learning rate are determined empirically for specific applications. In a variation other learning methods can be adopted to derive model parameters from training data. For example a conjugate gradient algorithm may be adopted for minimizing the specified objective or error.

Referring back to FIG. 1, the following example shows operation of the learning method on the 2D data set 100. The classification tree 110 that uses only one attribute (either $x_1$ or $x_2$) in each node has 3 splits (nodes) to correctly classify each vector of the data set into the class of circles or the class of rectangles. The decision boundary is represented by solid lines parallel to either axis in FIG. 1. The learning rule to fit the split parameters $(a_0, a_1, \ldots, a_m)$ in the node of the classification tree 120 shown in FIG. 1 is:

$$\Delta a_0 = -\mu\frac{\partial MSE(a_0)}{\partial a_0} \tag{22}$$

The derivative of the tree function with respect to parameter $a_0$ becomes $$\frac{dT_1(n, x_i)}{da_0} = \tag{23}$$

$$A(x, x_i)\frac{dT_1(n.1, x_i)}{da_0} + B(n, x_i)\frac{dn.c(x_i)}{da_0} + C(n, x_i)\frac{dT_1(n.r, x_i)}{da_0}$$

where $$\frac{dT_1(n.1, x_i)}{da_0} = 0 \tag{24}$$

$$\frac{dn.c(x_i)}{da_0} = 1$$

$$\frac{dT_1(n.r, x_i)}{da_0} = 0$$

and the derivative becomes $$\frac{dT_1(n, x_i)}{da_0} = B(n, x_i) \tag{25}$$

Taking this into account, the parameter update rule takes the form:

$$\Delta a_0 = -\mu\frac{1}{n}\sum(\tanh(T_1(n, x_i) - l_i))(1 - \tanh^2(T_1(n, x_i)))B(n, x_i) \tag{26}$$

$$\Delta a_1 = -\mu\frac{1}{N}\sum(\tanh(T_1(n, x_i) - l_i))(1 - \tanh^2(T_1(n, x_i)))B(n, x_i)x_{i,1} \tag{27}$$

-continued $$\Delta a_2 = -\mu \frac{1}{N} \sum (\tanh(T_1(n, x_i)) - l_i))(1 - \tanh^2(T_1(n, x_i)))B(n, x_i)x_{i,2} \quad (28)$$

where $B(n,x_j)$ is defined in (14) and $\mu$ is a small positive constant.

Using the data samples 100 from FIG. 1 as training data and the learning rule (26)-(28) a classification tree can built with one level and the split parameters in the first node [−4.04, 2.0, 2.0]. The decision boundary of the learned tree is virtually the same as for the classification tree 120. As a reference, for a learning rate $\mu$=0.2 the solution converged in 50 iterations.

Figure 3:
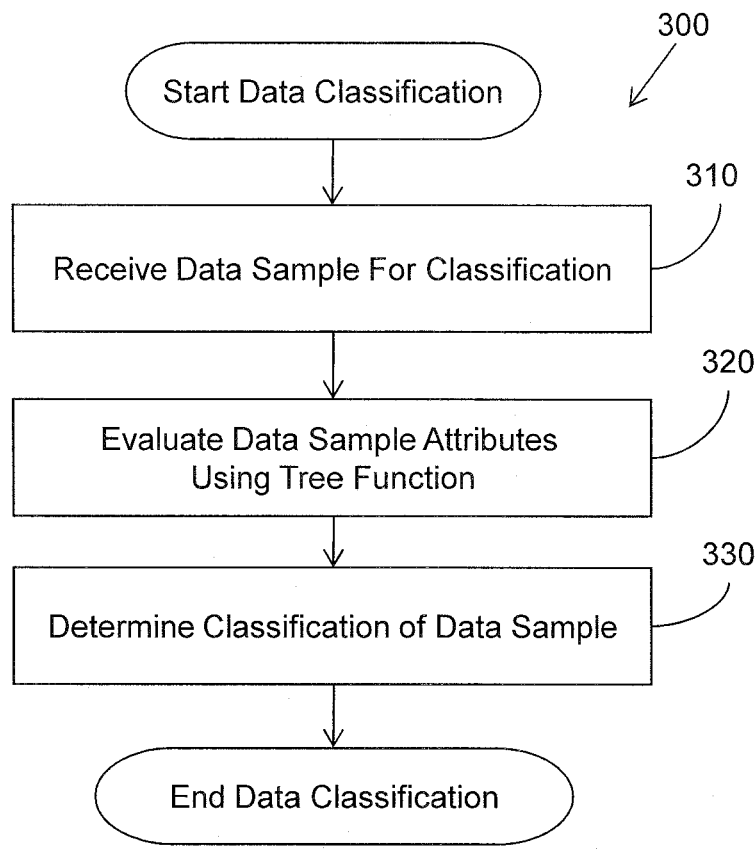
FIG. 3 illustrates one example embodiment of a method associated with classification trees with decision boundary split conditions.

FIG. 3 illustrates one example embodiment of a method 300 for classifying data. At 310, an input data sample is received for classification as belonging to one of two possible classes. The input data sample includes a set of attribute values. At 320, the method includes evaluating the set of attribute values with a tree function that defines a decision boundary of a classification tree. The tree function classifies an input data sample as belonging to one of the two possible classes based, at least in part, on the attribute values of the input data sample. At 330 a classification of the input data sample is determined based on an output of the tree function. The input data sample may be classified as belonging to a first class if the output of the tree function is positive and classifying the input data sample as belonging to a second class if the output of the tree function negative.

Figure 4:
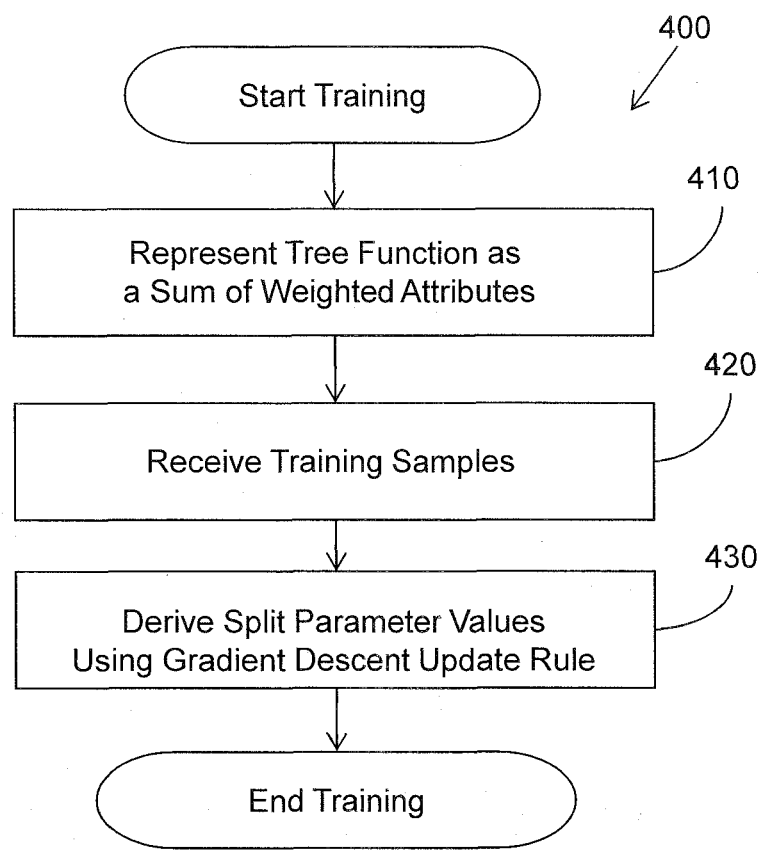
FIG. 4 illustrates one example embodiment of a method associated with classification trees with decision boundary split conditions.

FIG. 4 illustrates one example embodiment of a method 400 of using training data to derive a tree function that classifies input data samples as belonging to one of two possible classes based, at least in part, on values of attributes in the input data sample. At 410, the method includes accessing an initial tree function expressed as a sum of weighted data sample attributes. The weighted data sample attributes include a product of a given attribute and a split parameter associated with the attribute. (e.g., $a_0, a_1 \ldots a_x$ in FIG. 2). At 420 a plurality of training data samples that include a classification are received. At 430, the method includes applying a gradient descent parameter update rule to the training data samples to derive the split parameter values from the training data samples.

The gradient descent parameter update rule may include a derivative of the tree function expressed as an R-function-disjunction of one or more R-function-conjunctions corresponding to split conditions in nodes of the classification tree (see, e.g., equations 14, 26-28). The method may also include constructing a single-layer classification tree having a single node in which the single node has a multi-attribute split condition corresponding to the tree function. The single node may include a split condition that is a non-linear function of the attributes. The single node may include a split condition that is a function of all of the attributes in the input data samples.

Figure 5:
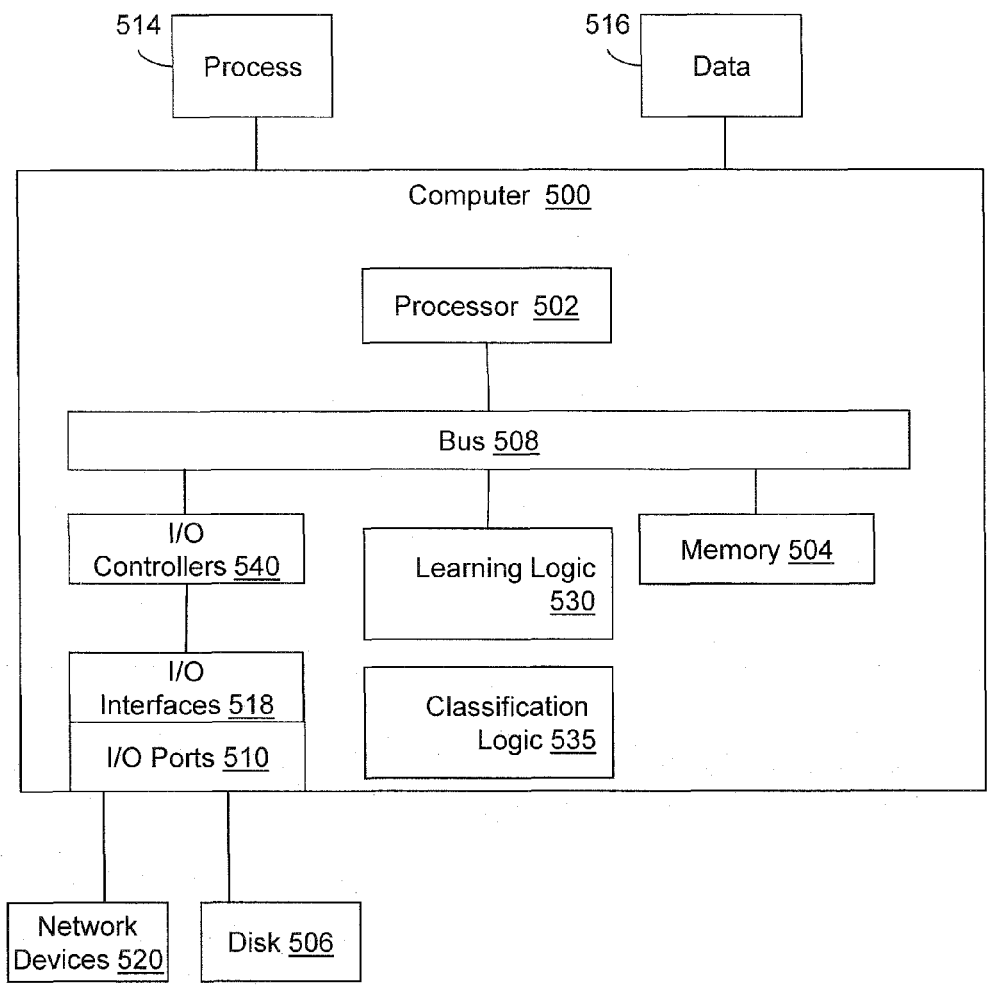
FIG. 5 illustrates an embodiment of a computing system in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a learning logic 530 configured to derive a tree function corresponding to a decision boundary of a classification tree. In different examples, the learning logic 530 may be implemented in hardware, a non-transitory computer-readable medium with stored instructions, firmware, and/or combinations thereof. While the learning logic 530 is illustrated as a hardware component attached to the bus 508, it is to be appreciated that in one example, the learning logic 530 could be implemented in the processor 502. In one embodiment, the learning logic 530 is a means (e.g., hardware, non-transitory computer-readable medium, firmware) for deriving a tree function corresponding to a decision boundary of a classification tree.

The means may be implemented, for example, as an ASIC programmed to apply a gradient descent parameter update rule to training data to derive the tree function. The means may also be implemented as stored computer executable instructions that are presented to computer 500 as data 516 that are temporarily stored in memory 504 and then executed by processor 502.

The computer 500 may include a classification logic 535 configured to classify data samples using a tree function corresponding to a decision boundary of a classification tree. In different examples, the classification logic 535 may be implemented in hardware, a non-transitory computer-readable medium with stored instructions, firmware, and/or combinations thereof. While the classification logic 535 is illustrated as a hardware component attached to the bus 508, it is to be appreciated that in one example, the classification logic 535 could be implemented in the processor 502. In one embodiment, the classification logic 535 is a means (e.g., hardware, non-transitory computer-readable medium, firmware) for classifying data samples using a tree function corresponding to a decision boundary of a classification tree.

The means may be implemented, for example, as an ASIC programmed to classify data samples using a tree function corresponding to a decision boundary of a classification tree. The means may also be implemented as stored computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the I/O interfaces 518, and/or the I/O ports 510. Through the network devices 520, the computer 500 may interact with a network. Through the network, the computer 500 may be logically connected to remote computers. Networks with which the computer 500 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the various methods and implement the various systems described herein, for example, with reference to FIGS. 3-4.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to perform a method, the method comprising:
    determining a Boolean function that recursively defines split conditions in each node of a binary classification tree as a disjunction of i) a first conjunction of split conditions for the node and one of the node's child nodes and ii) a second conjunction of split conditions for the node and the other of the node's child nodes;
    representing the binary classification tree as a Rvachev classification tree function by replacing each disjunction in the Boolean function as an Rvachev disjunction and each conjunction in the Boolean function as a Rvachev conjunction;
    deriving a split parameter update rule for a tree function based, at least in part, on a derivative of the Rvachev classification tree function;
    applying the split parameter update rule to a plurality of training data samples to determine split parameters for a tree function, where the tree function comprises a sum of products of respective attributes and respective split parameters associated with the respective attributes; and
    receiving an input data sample for classification as belonging to one of two possible classes, wherein the input data sample includes a set of attribute values;
    evaluating the set of attribute values with the tree function; and
    classifying the input data sample as belonging to one of the two classes based, at least in part, on an output of the tree function.

2. The non-transitory computer-readable medium of claim 1, wherein the classifying comprises classifying the input data sample as belonging to a first class when the output of the tree function is positive and classifying the input data sample as belonging to a second class when the output of the tree function is negative.

3. The non-transitory computer-readable medium of claim 1, wherein the method further comprises constructing a single-layer classification tree having a single node, wherein the single node has a multi-attribute split condition corresponding to the tree function.

4. The non-transitory computer-readable medium of claim 3, wherein the method further comprises constructing a single-layer classification tree having a single node in which the split condition is a non-linear function of the attributes.

5. The non-transitory computer-readable medium of claim 3, wherein the method further comprises constructing a single-layer classification tree having a single node in which the split condition is a function of all of the attributes.

6. A computing system, comprising:
a learning logic configured to:
  determine a tree function by:
    determining a Boolean function that recursively defines split conditions in each node of a binary classification tree as a disjunction of i) a first conjunction of split conditions for the node and one of the node's child nodes and ii) a second conjunction of split conditions for the node and the other of the node's child nodes;
    representing the binary classification tree as a Rvachev classification tree function by replacing each disjunction in the Boolean function as an Rvachev disjunction and each conjunction in the Boolean function as a Rvachev conjunction;
    deriving a split parameter update rule for a classification boundary based, at least in part, on a derivative of the Rvachev classification tree function;
    applying the split parameter update rule to a plurality of training data samples to determine split parameters for the tree function, where the tree function comprises a sum of products of respective attributes and respective split parameters associated with the respective attributes; and
memory configured to store the tree function; and
a classification logic configured to receive an input data sample for classification and (ii) cause a processor to evaluate attribute values of the input data sample with the tree function to determine a classification of the input data sample.

7. The computing system of claim 6, wherein the learning logic is configured to apply a gradient descent parameter update rule that includes a derivative of the tree function expressed as an Rvachev-disjunction of one or more Rvachev-conjunctions corresponding to split conditions of the binary classification tree.

8. The computing system of claim 6, wherein the memory stores a single-layer classification tree having a single node with a multi-attribute split condition corresponding to the tree function.

9. The computing system of claim 6, wherein the memory stores a single-layer classification tree having a single node with a split condition that is a non-linear function of the attributes.

10. The computing system of claim 6, wherein the memory stores a single-layer classification tree having a single node with a split condition that is a function of all of the attributes.

* * * * *

UNITED STATES PATENT AND TRADEMARK OFFICE
CERTIFICATE OF CORRECTION

PATENT NO.        : 8,868,473 B2
APPLICATION NO.   : 13/279447
DATED             : October 21, 2014
INVENTOR(S)       : Urmanov et al.

Page 1 of 1

It is certified that error appears in the above-identified patent and that said Letters Patent is hereby corrected as shown below:

In the Specification

In column 4, line 10, delete "$x_m$is" and insert -- $x_m$ is --, therefor.

In column 5, line 29, delete "$fv^{(S_2)}$" and insert -- $-fv^{(S_2)}$ --, therefor.

In column 5, line 36, delete "$T_l$" and insert -- $T_1$ --, therefor.

In column 5, line 36, delete "$T_l$" and insert -- $T_1$ --, therefor.

In column 5, line 41, delete "tan h" and insert -- tanh --, therefor.

In the Claims

In column 12, line 11, in Claim 6, after "to" insert -- (i) --.

Signed and Sealed this
Sixteenth Day of February, 2016

Michelle K. Lee
*Director of the United States Patent and Trademark Office*